D. A. ORE.
BAIT CARRYING ATTACHMENT FOR FISH HOOKS.
APPLICATION FILED AUG. 15, 1917.

1,261,601. Patented Apr. 2, 1918.

Witnesses

Inventor
D. H. Ore
By
Attorneys

UNITED STATES PATENT OFFICE.

DAVID A. ORE, OF MOUNTAIN GROVE, MISSOURI.

BAIT-CARRYING ATTACHMENT FOR FISH-HOOKS.

1,261,601.         Specification of Letters Patent.       Patented Apr. 2, 1918.

Application filed August 15, 1917. Serial No. 186,368.

*To all whom it may concern:*

Be it known that I, DAVID A. ORE, a citizen of the United States, residing at Mountain Grove, in the county of Wright, State of Missouri, have invented certain new and useful Improvements in Bait-Carrying Attachments for Fish-Hooks; and I do hereby declare the following to be a full, clear, and exact description of the invention, such as will enable others skilled in the art to which it appertains to make and use the same.

This invention is an improvement in fishing tackle and has particular reference to a bait carrying attachment for fish hooks.

An object of the invention is to provide an improved attachment which will effectively prevent the loss of either artificial or live bait from the hook and which will not interfere with the hooking of a fish.

Another object is to provide a device of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1:
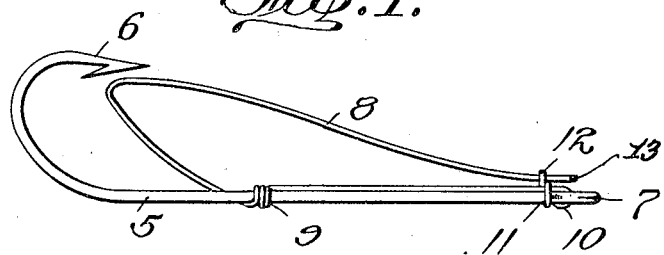
Figure 1 is a side elevation of a fish hook showing the invention applied thereto.
Figure 2:
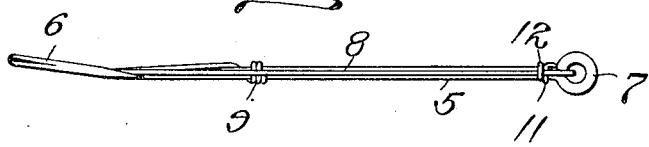
Fig. 2 is an edge elevation.
Figure 3:
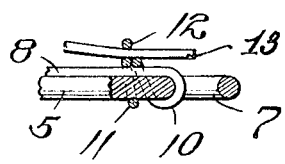
Fig. 3 is a longitudinal section through the shank of the hook.
Figure 4:
Fig. 4 is a fragmentary perspective view of the attachment.
Figure 5:
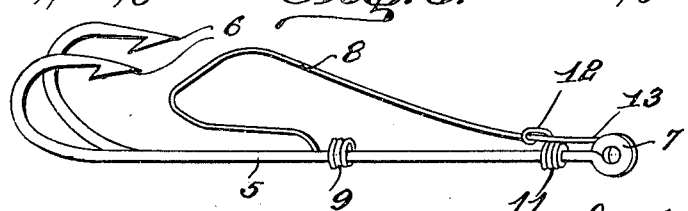
Fig. 5 is a perspective view showing the attachment applied to a double hook.

Referring more particularly to the accompanying drawing the numeral 5 indicates the shank of a fish hook which may be of any preferred construction having the point or points 6 at one end and the eye 7 at its other end, it being understood that the attachment may be applied to hooks having any number of points.

The attachment which comprises the essential feature of this invention is preferably formed of a single length of wire bent as indicated at 8 a considerable distance from one end thereof to provide a loop which is arranged, when the attachment is in position, contiguous to the point 6 of the hook. The wire is then extended to the shank 5 and wound or twisted thereabout as indicated at 9 so as to secure the guard to the shank. From this twisted portion the wire is extended longitudinally of the shank to the eye 7 and passed therethrough, thus forming a loop 10. The wire is then coiled or twisted about the shank 5 and that portion of the wire adjacent the eye 7 as indicated at 11 and the extremity of the wire is then bent upon itself to provide a catch or hook 12 for detachably receiving the other end 13 thereof whereby to securely maintain the bait upon the attachment and prevent accidental displacement thereof.

In practice, the end 13 is detached from the catch 12 and the bait is then run onto the loop 8 so that the same will be in the desired position adjacent the point or points 6 of the hook. The end 13 is then again engaged with the catch 12 whereupon the hook is ready for casting.

What is claimed is:—

1. A bait carrying attachment for fish hooks formed from a single length of wire bent upon itself to provide a loop arranged contiguous to the point of the hook, said wire being also twisted around the shank of the hook and extended longitudinally thereof, and bent upon itself at its other end to provide a catch for receiving the opposite end thereof.

2. A bait carrying attachment for fish hooks formed from a single length of wire bent upon itself to provide a loop arranged contiguous to the point of the hook, said wire being also twisted around the shank of the hook and extended longitudinally thereof, one end of the wire being extended through the eye of the hook and then twisted about the shank of said hook adjacent said eye and the portion of said wire extending longitudinally of said shank, said end terminating in a catch adapted to receive the other end of the wire.

In testimony whereof, I affix my signature in the presence of two witnesses.

DAVID A. ORE.

Witnesses:
    LYNN NEWTON,
    GEO. W. NEWTON.

Copies of this patent may be obtained for five cents each, by addressing the "Commissioner of Patents, Washington, D. C."